US006268863B1

(12) United States Patent
Rioux

(10) Patent No.: US 6,268,863 B1
(45) Date of Patent: Jul. 31, 2001

(54) METHOD OF SIMULATING A PHOTOGRAPHIC CAMERA

(75) Inventor: Marc Rioux, Ottawa (CA)

(73) Assignee: National Research Council Canada, Ottawa (CA)

( * ) Notice: Subject to any disclaimer, the term of this patent is extended or adjusted under 35 U.S.C. 154(b) by 0 days.

(21) Appl. No.: 08/942,495

(22) Filed: Oct. 2, 1997

(51) Int. Cl.[7] .................................................. G06T 15/10
(52) U.S. Cl. ............................................ 345/427; 345/426
(58) Field of Search ..................................... 345/419, 426, 345/427, 421, 433

(56) References Cited

U.S. PATENT DOCUMENTS 5,479,597 * 12/1995 Fellous .................................. 395/154

OTHER PUBLICATIONS

Doug King (Picture–Perfect Models, Computer Graphics World vol. 20 Issue:nl—Jan. 1, 1997.*
"How to Take Great Fall Photos": Eodice Lynne: Petersen's Photographic vol: v26 Issue: n5, Sep. 1997.*
"Video tools' top stars": Jim Heid: macWorld vol. v14 Issue: n5, May 1997.*
"A Lens and Aperture Camera Model for Synthetic Image Generation": Michael Potmesil and Indrajit Chakravarty: Computer Graphics, vol. 15, No. 3, Aug. 1981.*
"Advanced Animation and Rendering Techniques": Alan Watt and Mark Watt, Addison Wesley Longman Limited; Section 2.1.1, 1992.*
"3D Studio Max" User guide: vol. 2: Sections 20–17; Tutorials: 3–17, Mar. 1996.*

* cited by examiner

Primary Examiner—Mark Zimmerman
Assistant Examiner—Mano Padmanabhan
(74) Attorney, Agent, or Firm—Freedman & Associates

(57) ABSTRACT

Simulating a photographic camera for rendering two-dimensional images of virtual three-dimensional objects enhances flexibility and ease of use of a rendering system. Simulating a photographic camera is performed by determining light from virtual light sources that passes through a lens of the simulated photographic camera having an aperture, focus, and shutter speed and is incident upon the imaging plane within the camera. The method also has application in teaching photography because, in some instances, computer simulation reduces the cost of equipment and consumables.

16 Claims, 5 Drawing Sheets

Prior Art

| Lens | focus | Imaging plane |
|---|---|---|
| type | f-stop | size |
| orientation | shutter speed | orientation |
| location | film speed | location |

METHOD OF SIMULATING A PHOTOGRAPHIC CAMERA

FIELD OF THE INVENTION

This invention relates generally to image generation and more particularly to a method of simulating a photographic camera for rendering two-dimensional images.

BACKGROUND OF THE INVENTION

Computer graphics is a field that is best described as a merger of art and science. Many popular graphics tools require a significant amount of training in order to make use of features provided. Popular areas for computer graphics include desktop publishing, animation, and photography.

Not unlike painting, drawing, photography, machining, sculpture, etc., individuals develop niches within desktop publishing. These skills are very significant for high end professional publishing efforts. High end efforts often require a team of specialized individuals each performing a subset of tasks required to produce the end result.

In lower end desktop publishing efforts, a series of less sophisticated tools that provide fewer, but easier to use features are used. It is, therefore, highly desirable to provide ease of use for applications addressing the desktop publishing market. It is also desirable to provide advanced features in an easy to understand and learn or "intuitive" fashion.

In animation, a similar problem exists. Often computer animation is performed using a team of artists and a team of computer operators or computer animation specialists to achieve the desired results. These results often require significant duplication of effort and significant management skill to maintain communication between the groups. An intuitive feature full animation tool obviates the need for a team of computer operators by allowing the artists to act both as artists and as computer operators.

In photography, digital photography is replacing the well known system of capturing photographs, processing the negatives, printing the photographs, and scanning them into a computer for inclusion in computer graphics. Unfortunately, many features available in cameras, are not available in digital cameras. For the artistic community, this still presents significant advantages to using non-digital cameras.

Unfortunately, the ease of use of an application is very difficult to design. Firstly, most designers are scientists and have little appreciation for the user of a system. Secondly, computers are not designed to provide the same instantaneous visual and tactile feedback that is the result of art. Thirdly, many complex graphics applications are designed for specific niche markets and not intended for the desktop publishing market.

Digital cameras are becoming a common tool in photography and graphic arts. A common form of digital camera replaces its non-digital equivalent. A camera, often provided with a wide angle lens and a digital auto-focus circuit allows for point and shoot photography. Most often objects at a central location within an image appear in focus. Some digital cameras are provided with multiple auto-focus settings allowing objects at different locations within an image to be the focus point for the image.

In order to produce an image of an object for use in desktop publishing, the object is set up in a display and photographed with a digital camera. When the object is unavailable, an image of the object is drawn in at a later time or a mock up of the object is photographed. Once the image is captured, the photographer can rearrange the objects for further photographing when desirable or, when pleased with the captured image, can move on the another project. Unfortunately, a desktop publisher is incapable of easily modifying the captured image.

In practice, a photographer captures an image and sends it to a desktop publisher. In today's global market place, the photographer and the desktop publisher may be in different cities and transmit information electronically or by courier. Also, some objects such as museum pieces are geographically restricted so a photographer local to the object is necessary. When an image is unacceptable due to layout considerations or management concerns, the problems are conveyed to the photographer who captures new images and sends them to the desktop publisher again. Unfortunately, it is difficult for the photographer to see exactly what the desktop publisher has in mind; this process may repeat numerous times. When a courier is used for sending photographs, the process may take weeks or longer. During that period, the photographer's studio must remain occupied, or the photographer must expend significant amounts of time setting up the studio prior to each photo shoot for the desktop publisher. Because of this, even small changes are costly.

Capturing three-dimensional digital information regarding object geometry and colour is known as described, for example, "Using images to estimate reflectance functions" by K. F. Karner (Proceedings of WSCG '96: Fourth International Conference in Central Europe on Computer Graphics and Visualization 96; 1996; 2 vol. Iii+427 pp.p.133–40 vol. 1) and "BRDF reference standards for the infrared" by Oppenheim, Turner and Wolfe (Infrared-Physics-&-Technology; vol. 35, no. 7; Decemeber 1994; p. 873–9) among other references. For example, a range sensor and an object are moved relatively one to the other to capture range images of each external surface of the object. The object geometry is then formed by a composite of all images and accurately reflects the geometry of the object captured. Colour information is currently captured using normal reflectance which determines a true colour of an object from an angle at a normal to the surface of the object. For most objects, this is sufficient colour information to accurately display an image of the object on a computer screen. The information is stored with reference to positional information in the form of colour and location, pattern and area, etc. The object of colour capture is to allow a more complete reconstruction of an image of the object.

Thin film effects as are commonly seen in soap bubbles are not easily modeled using normal reflectance. For these, bi-directional reflectance distribution functions (BRDF) are captured. Methods of capturing BRDF are known and current work in that area is improving quality, speed and ease with which BRDF are captured. Using BRDI information, accurate reconstructions of images of modeled objects are possible from virtually any angle. Of course, a captured model is capable of augmentation to improve colour or geometric information as technology improves.

Currently, these three-dimensional object models are viewed with software viewers on a computer display. The viewers render the objects in a known fashion as described below.

Thus, in an attempt to overcome these and other limitations of known prior art devices, it is an object of this invention to provide a method of simulating a camera with a computer.

SUMMARY OF THE INVENTION

In accordance with the invention, there is provided a method of simulating the functionality of a photographic camera having a lens, an imaging plane and parameter values effecting imaging comprising the steps of:

a) locating within a virtual space a virtual three-dimensional object to be imaged;

b) providing parameter values from the parameter values; and, c) rendering a two-dimensional digital image of the virtual three-dimensional object by simulating light passing through the lens and onto the imaging plane of the photographic camera having parameter values substantially the same as the provided parameter values.

In accordance with the invention, there is provided a method of simulating the functionality of a photographic camera having a lens, an imaging plane and parameter values effecting imaging comprising the steps of:

a) locating within a virtual space a virtual three-dimensional object to be imaged;

b) locating within a virtual space a virtual light source;

c) providing a parameter value indicative of a desired depth of field; and, d) rendering a two-dimensional digital image of the virtual three-dimensional object and having the desired depth of field by simulating light from the virtual light source passing through the lens and onto the imaging plane of the photographic camera having an aperture dependent upon the desired depth of field.

An advantage of the present invention is an ease of use presented to photographers who are using computer graphics.

An advantage of the present invention is an ability to image an object fewer times by simulate photography of an object a plurality of times for a single three-dimensional image of the object.

Another advantage of the present invention is its applicability to training photographers at a lower cost than current training methods.

BRIEF DESCRIPTION OF THE DRAWINGS

Exemplary embodiments of the invention will now be described in conjunction with the following drawings, in which.

DETAILED DESCRIPTION

Rendering is a process of imaging virtual three-dimensional objects to form a two-dimensional image. Typically, the virtual three-dimensional objects are stored as electronic representations of three-dimensional objects or as a plurality of representations of three-dimensional objects grouped in a predetermined fashion.

Two typical methods of forming virtual three-dimensional objects are construction and imaging. In construction a virtual three-dimensional object is drawn or constructed using simple shapes to form a desired virtual three-dimensional object. Colour or texture are then added to the object as desired. In imaging, a three-dimensional representation of a real three-dimensional object is formed. Real colour and texture data are associated with the representation so as to form a near complete definition of the appearance of the object. Of course, a hybrid of these methods is available wherein, for example, real colour information is overlayed on a constructed geometry or wherein a virtual object formed by imaging a real three-dimensional object is then modified. Modifications of geometry, colour, material, texture, reflectance, etc. may be applied to the virtual object to form a different three-dimensional virtual object.

Throughout this disclosure and the claims thereafter, the term virtual is used to denote an electronic representation of a "real" object. A virtual camera is an electronic representation of a camera. A virtual light is an electronic representation of a light. A virtual three-dimensional object is an electronic representation of a three-dimensional object. It is evident to those of skill in the art that the term virtual as used herein may be applied to any "real" object or phenomenon. It is also evident that a "real" object need not exist for a virtual object of that object to exist.

Figure 1:
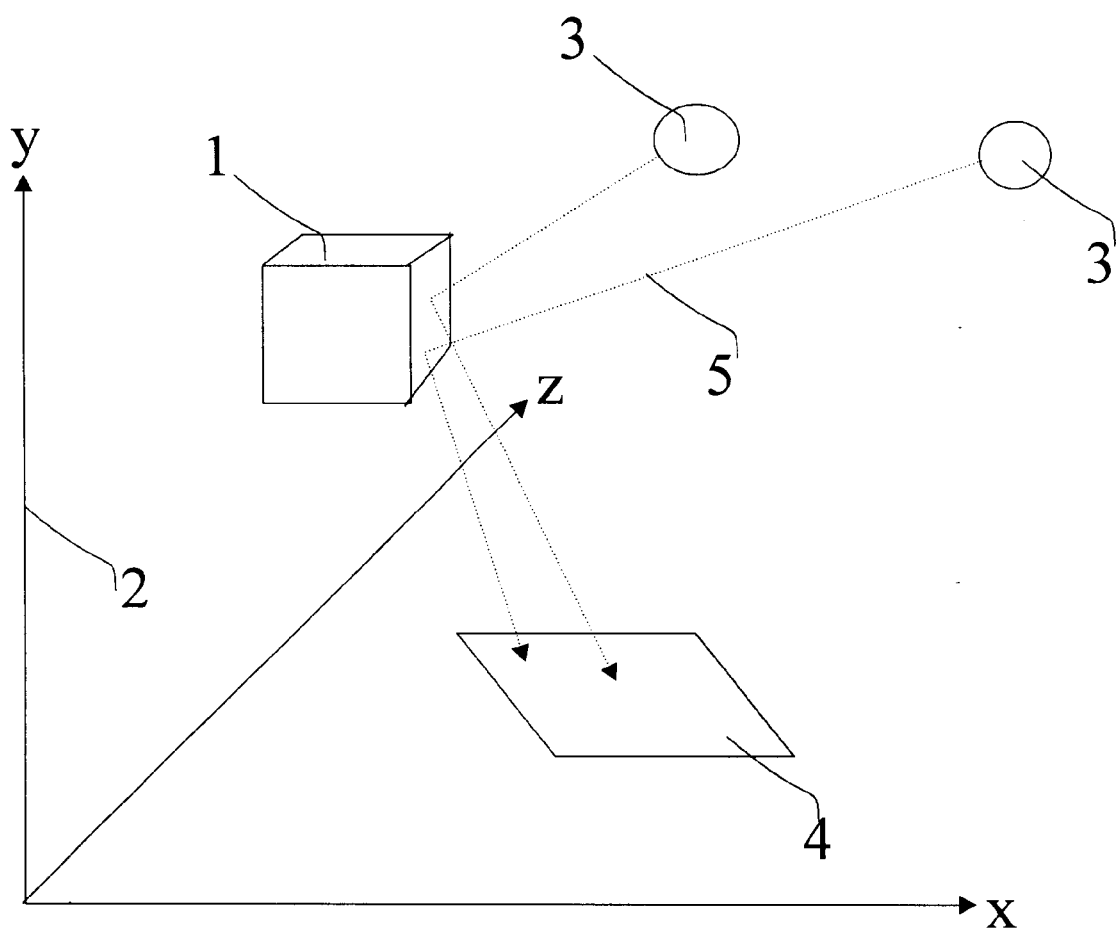
FIG. 1 is a simplified flow diagram of a prior art method of rendering.

Referring to FIG. 1, a simplified diagram of a prior art method of rendering is shown. A virtual three-dimensional object 1 is placed within a virtual space 2. Some virtual light sources 3 are placed within the space 2. Of course, ambient light or non-natural lighting configurations are also possible. A perspective is determined in the form of an imaging plane 4. Light (shown in dashed lines) 5 from the one or more virtual light source(s) is simulated and light reaching the imaging plane 4 is determined. The light reaching the imaging plane 4 is determinative of the rendered image. Other forms of rendering such as z-plane are also known in the art.

Figure 2:
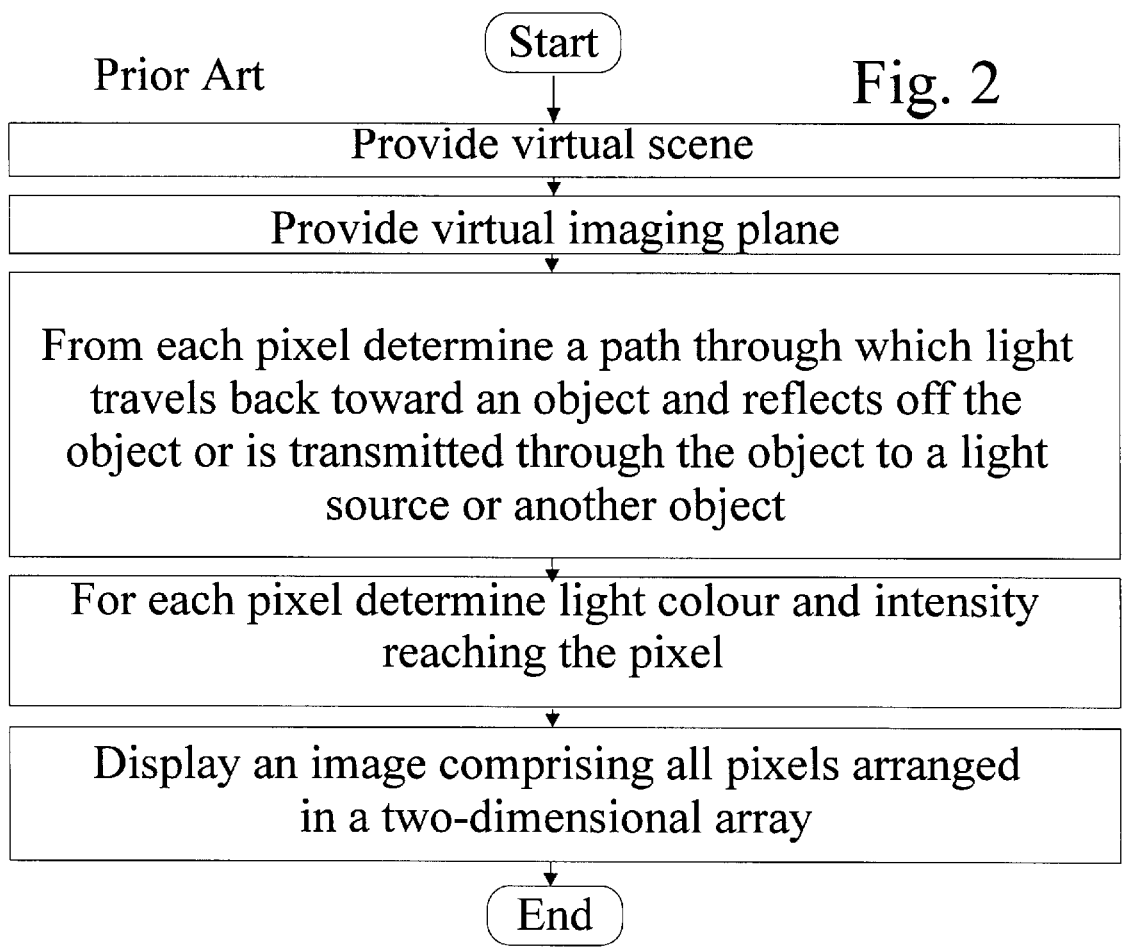
FIG. 2 is a simplified diagram of a prior art method of rendering a two-dimensional image.

Referring to FIG. 2, a simplified flow diagram of a prior art method of rendering a two-dimensional image consistent with the diagram of FIG. 1 is shown. A virtual scene containing virtual lighting and virtual objects is provided. An imaging plane having finite dimensions is provided. It is desired that the virtual scene be imaged onto the imaging plane. Each point or pixel within the imaging plane is determined independently through a same method. Assembly of all points or pixels results in a rendered two-dimensional image. There are many known methods for determining each pixel. One such method, ray tracing, involves determining a path for each pixel within the imaging plane by which light reaches the pixel. This method follows light from the imaging plane back toward its source and thereby determines a colour and intensity of light reaching the imaging plane. Once a colour and intensity are determined for each pixel, a two-dimensional rendered image is displayed or stored for later use.

Figure 3:
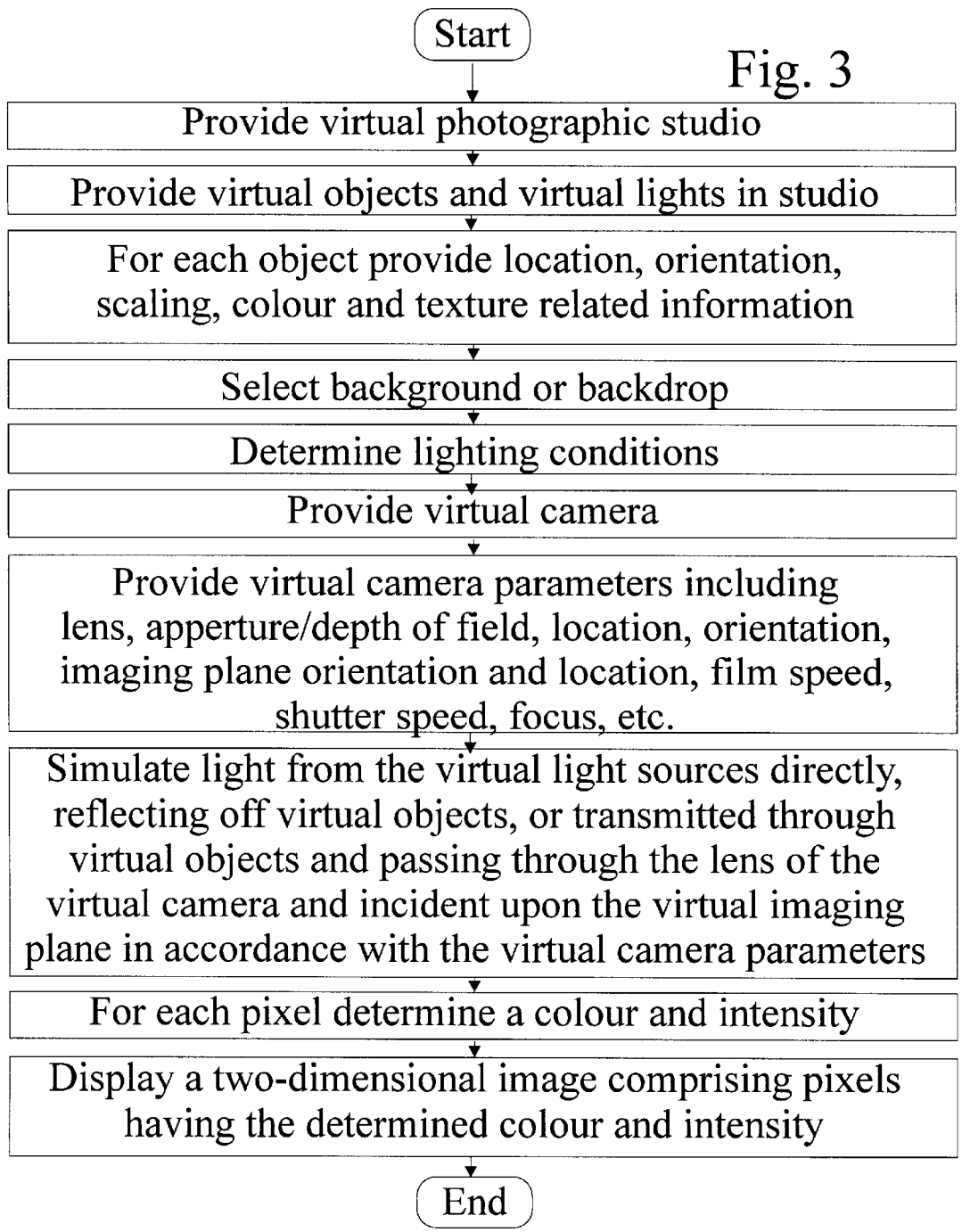
FIG. 3 is a simplified diagram of a method of rendering a two-dimensional image of a virtual object according to the invention.

Referring to FIG. 3, a simplified diagram of a method of simulating photographing a virtual object according to the invention is shown. A virtual photographic studio is provided in which to place virtual objects and virtual lights. A first virtual object in the form of an imaged representation of a three-dimensional object is located within the virtual photographic studio. Other objects are located within the studio and relative to the first virtual object. Each object is provided with a location and an orientation. Optionally, scale, colour, and texture are added or modified for imaging purposes. For example, piece of ancient painted pottery is placed in the studio. The virtual paint is cleaned up and the colours are renewed. It is evident to those of skill in the art, that similar operations performed on the original pottery may affect value or damage the artifact; however, the virtual pottery is available for transformation, alteration, or reparation as desired.

One such transformation shows a vase in a number of interesting poses having more or less information contained within each pose. For example, 3 poses are provided with geometric information only, with geometric and pattern information, and with geometric, pattern and colour information. This allows an analysis of a two-dimensional rendered image to determine shading effected through colouring versus effects of geometry or texture.

A backdrop or background is selected. Optionally, the backdrop is a two-dimensional image. Because of the nature of rendering, properties of objects, backdrops, etc. need not reflect "true" properties of their real equivalents. For example, when the backdrop is a blue sky, it is provided a property having no reflectance and providing some level of ambient lighting. This differs significantly from a same backdrop in a photographic studio. Alternatively, the backdrop has properties identical to those of a similar backdrop in a photographic studio.

Appropriate lighting is determined in the form of virtual light sources. Lighting, like backdrops, need not have properties similar to real lights. Of course, in some instances, properties simulating those of real lights are desired. Also, objects within the virtual studio are not subject to gravity and other known limitations of using a real photographic studio.

In order to render the virtual objects, a virtual camera is provided. The virtual camera when simulated provides similar functionality to a real camera. The camera has a lens that simulates a zoom lens and allows for selection of a lens length. Alternatively, a plurality of available lenses are provided from which a lens is selected. In the real camera, a lens is provided with an aperture for selecting depth of field and a shutter. When simulating the virtual camera, depth of field is provided in accordance with an f-stop value. Alternatively, another value is used to determine depth of field in the form of a depth of field value or an aperture value.

The virtual camera is provided with a plurality parameter values. A perspective is determined by providing a camera location and orientation. Alternatively, an image is framed and a camera location and orientation is calculated to provide the framed image with the selected lens.

The imaging plane of the virtual camera, where film is located in its real counterpart, is oriented relative to the virtual lens. For example in common 4×5 cameras, a bellows is disposed between a lens carrier and an imaging plane. The bellows allows the imaging plane to be tilted relative to the lens so that the imaging plane and the plane of the lens are not parallel. This relative motion allows a photographer to alter perspective and composition. In general, digital cameras do not provide this flexibility. Most commonly available cameras also do not support this functionality. For example, for portraiture, bellows are not considered advantageous. The method of the present invention supports simulation of a bellows camera, and also allows for a fixed imaging plane relative to the lens location when the added functionality is not desired.

Film speed, focus, and shutter speed are selected from available values. Available values are determined in dependence upon an application of the method. For example, when used to train photographers, available values are substantially the same as those available in a real camera. It will be evident to those of skill in the art, that when used for imaging, significant flexibility in selecting the values results in greater flexibility in the imaging process and may be advantageous.

Light from the virtual light sources is simulated and simulated light passing through the virtual lens and reaching the virtual imaging plane at predetermined points thereon is determined and forms a pixel. The pixels are assembled into an image to render a two-dimensional image. The simulated light reaching the imaging plane is effected, in simulation, by the lens parameter values in accordance with known photographic principles. In this way, an image of an object is formed using a rendering technique that is substantially analogous to photographing the object in a photographic studio. Depth of field is selectable as is perspective, contrast, etc. Advantageously, the virtual camera is provided with an easy to use interface that is easily understood by someone with experience in photography.

Essentially, the flow diagram of FIG. 3 simulates a camera within a photographic studio in a virtual space. The uses of such a simulated photographic studio are numerous. Photography is time consuming and difficult to learn. It is very costly to experiment with many lighting and background choices when using film. Using the method according to the present invention, education in photography is possible at a greatly reduced cost to that currently available. Further, photographers and artists can test out angles and lighting prior to capturing images with a real camera. These advantages are achieved even when rendering resolution is considerably less than that of photographs.

A further advantage is the ability of desktop publishers to render images given a three-dimensional representation. A model of a package can be provided prior to any production, thereby alleviating a need to produce a mockup. The package, once rendered, appears to be a photograph of an actual package. Museums with catalogues of three-dimensional representations can produce photographs of collections or of groups of pieces without moving the pieces. The same person who could have performed the task beforehand, albeit at the risk of damaging the pieces, can now photograph the same pieces in a virtual studio. This also allows for image search resources, representation modification, and other rapid alterations of the photograph layout and contents.

This also allows for a single digital representation of an object to be used in a plurality of virtual photographic studios simultaneously and, for virtually unlimited photographs of an artifact to be simulated without adverse effect to the artifact. For museums, students, researchers, and historians, this advantage is significant.

Figure 4:
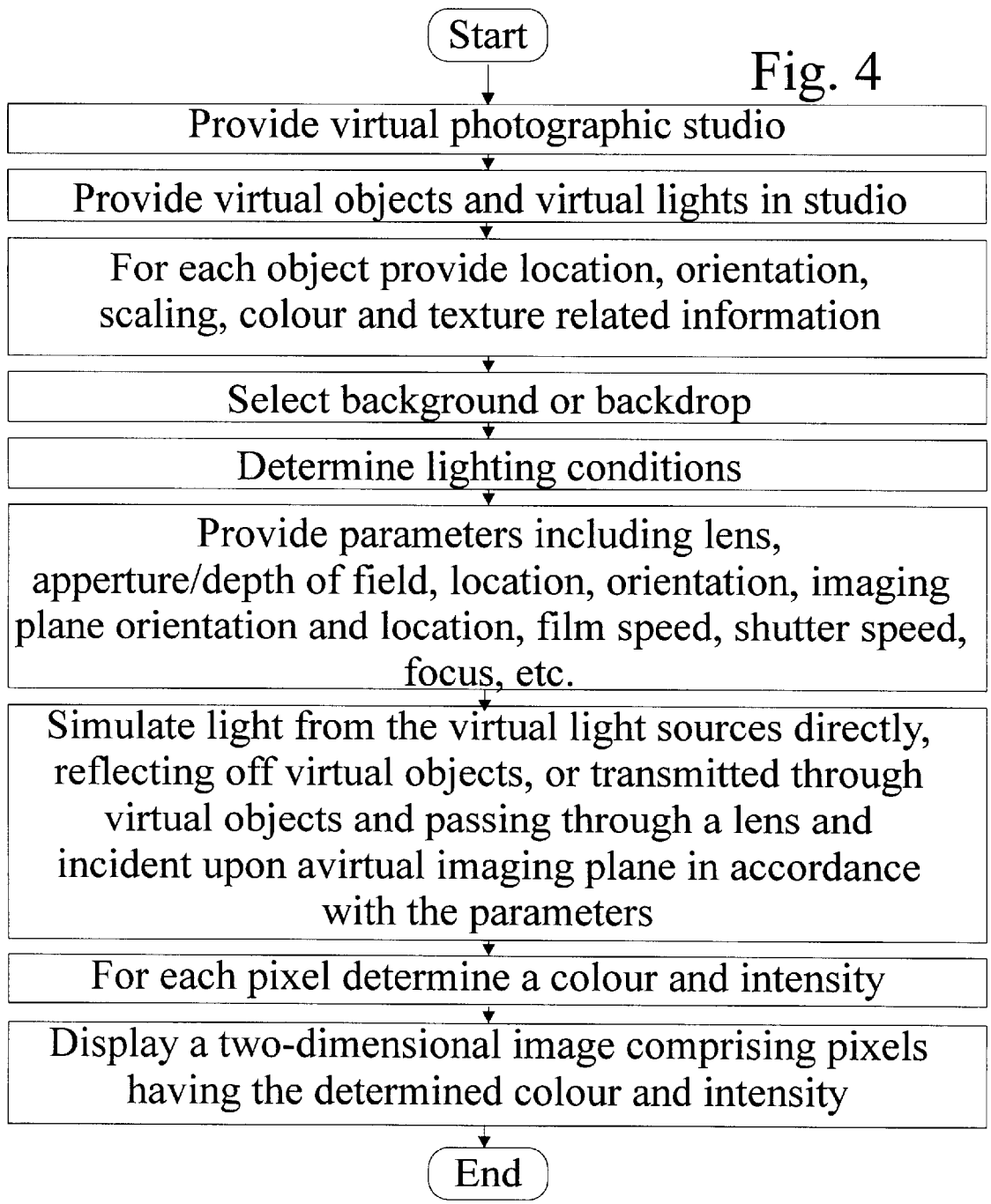
FIG. 4 is a simplified flow diagram of a method according to the invention is shown wherein camera parameter values are provided and a camera is simulated.

Referring to FIG. 4, a simplified flow diagram of a method according to the invention is shown wherein camera parameter values are provided and a camera is simulated, but the virtual camera itself is not provided as such. A virtual photographic studio is provided in which to place virtual objects and virtual lights. A virtual object in the form of an imaged representation of a three-dimensional object is located within the virtual photographic studio. A backdrop or background is selected. Appropriate lighting is determined in the form of virtual light sources.

In order to render the virtual object, a camera is simulated. The camera has parameter values similar to real photographic cameras. A perspective is providing to the rendering system. A lens focal length or other lens identifier is selected from predetermined lenses. The imaging plane of the virtual camera, where film is located in its real counterpart, is oriented relative to the virtual lens. Film speed, f-stop, focus, and shutter speed are selected from available values.

Light from the virtual light sources is simulated and light passing through a virtual lens located where the lens of the simulated camera is situated is used to render a two-dimensional image. The simulated light reaching the simulated imaging plane is effected by the simulated lens parameter values in accordance with known photographic principles. In this way, an image of an object is formed using a rendering technique that is substantially analogous to photographing the object in a photographic studio. Depth of field is selectable as is perspective, contrast, etc.

Figure 5:
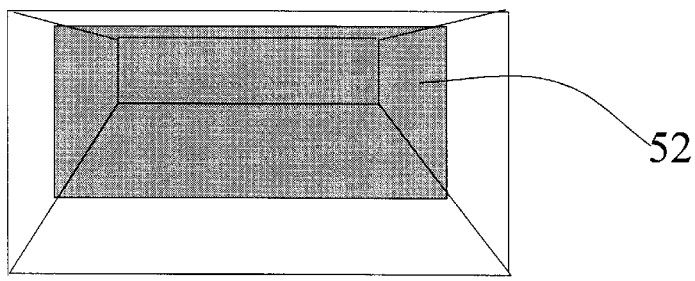
FIG. 5 is a user interface for entering the parameter values.

Referring to FIG. 5, a user interface is shown for entering the parameter values. A table of values is disposed about the virtual studio to enable modification of parameter values. Interactive response to parameter value changes allow a user of the interface to gauge the effects of changes provided. For example, altering the f-stop alters a depth of a shaded area 52 showing the depth of field and altering the focus of the lens moves the shaded area toward or away from the imaging plane.

Figure 6:
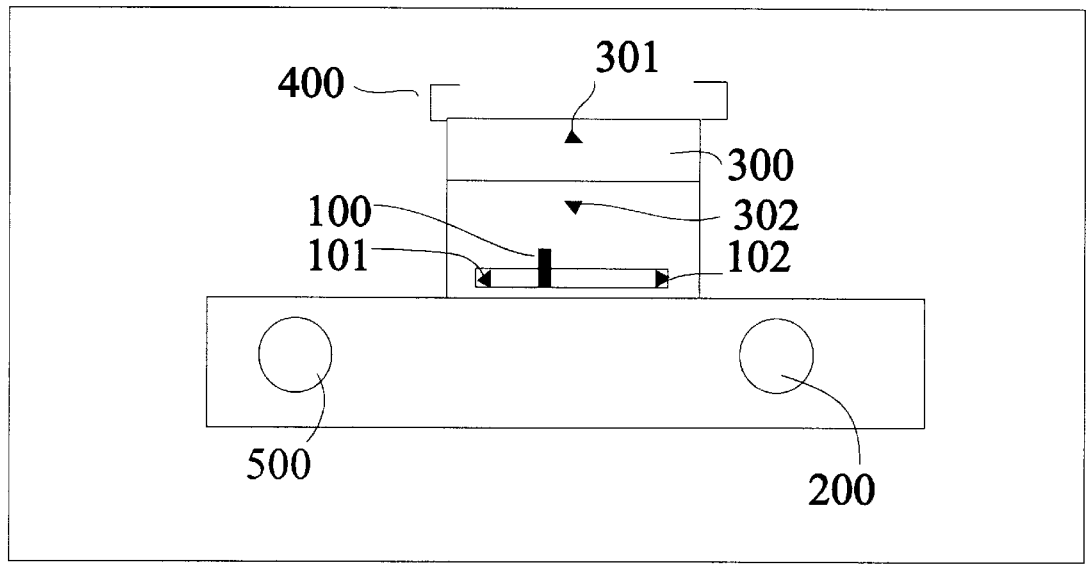
FIG. 6 is another user interface for use with the invention.

Referring to FIG. 6, another user interface is shown for entering the parameter values. Here, an image of a camera is provided having input/output analogous to that of a photographic camera and representing values of parameters. An f-stop lever 100 is slidable across the lens 300. Scroll arrows 101 and 102 allow incrementing or decrementing of the f-stop by a predetermined amount. The lens is also slidable to lengthen or reduce the focal length. Scroll arrows 301 and 302 allow for incrementing or decrementing the focal length a predetermined amount. A shutter speed indicator 200 allows for shutter speed selection. A film speed indicator 500 allows for film speed selection. A filter mount 400 is disposed in front of the lens 300 and allows for mounting of a virtual filter in the form of a polariser, colour or other photographic filter in front of the lens. Filters are well known in the art of photography. A method of simulating the optical effects of a filter is evident to those of skill in the art of rendering.

In an alternative embodiment of the invention, a thumbnail of a rendered image is displayed prior to rendering the complete image. A low resolution thumbnail is rendered more rapidly than a high resolution image, but often contains enough information to evaluate the image composition, perspective, and content. The thumbnail is analogous to the image seen through a view finder on a common single reflex lens camera. The image allows for selecting appropriate camera angle and image composition before undertaking the lengthy and computationally intensive process of two-dimensional image rendering.

For example, when organising a traveling exhibit of museum artifacts, artifacts are selected from a number of museums. People attending the exhibits often desire a catalogue of artifacts or of the exhibit. These catalogues are best prepared in advance of the exhibit and, as such, requires photographs of numerous display pieces. Unfortunately, these pieces are often in different cities. One method of overcoming this problem is to assemble stock photographs of select artifacts for a catalogue. Unfortunately, each stock photograph has a different perspective, scale, background, etc. Assembling stock photographs results in a catalogue that, all too often, appears as an assembly of unrelated images.

Alternatively, the catalogue is prepared by re-photographing each artifact—either once assembled or at their respective locations—in accordance with a predetermined catalogue layout. Two known drawbacks to this approach are the effects of bright lights on artifacts and the amount of artistic control of the catalogue designer in the imaging process. Often museums do not permit photographing of artifacts due to the effect of flashes on artifact colours. This is very true of paintings and painted artifacts. The placement of the artifact in a bright light situation such as a studio, is detrimental to the artifact itself.

According to the invention, a three-dimensional model of each artifact is provided to the catalogue designer. Preferably, the three-dimensional model is formed by imaging the artifact according to known three-dimensional imaging techniques. Working with a photographer or alone, the catalogue designer sets up a virtual studio and photographs each artifact with a simulated camera. Background colours, perspective, and depth of field are selected for each image so as to meet the desired look of the catalogue. Images that are inappropriate once seen on a page, are rendered again using different camera settings for the simulated camera. Also, when two artifacts have similarities or differences, these can be enlarged as desired. When the three-dimensional model resolution is sufficient, the exhibit posters and signs may incorporate rendered images.

Advantageously, each three-dimensional model is delivered to the catalogue designer electronically providing near instantaneous access to each models. Also, imaging of each object need occur only once in order to produce countless rendered photographs of the object. The models are accessible any time after being captured. This allows preparation of a catalogue even when a particular artifact is on exhibit in a remote location or forms part of a traveling exhibit. Of course, many other advantages to designing and constructing a catalogue from three-dimensional models using a virtual photographic studio and a simulated camera exist.

In accordance with an embodiment of the invention, numerous tools available in photographic studios are simulated. For example, a virtual tripod on which the virtual camera is mounted is provided. Alternatively, the shake of a hand held camera is simulated. This is advantageous, for example, in teaching effects of longer exposure times absent a tripod to students or for artistic photography. In order to simulate the movement of a hand-held camera, light passing through the lens and onto each point on the imaging plane is determined at each of a plurality of instances of time and the simulated camera is moved therebetween. The light incident on the imaging plane from each time is then summed to form a final image. Contrast adjustment is performed when desired. Complex lighting is provided in the form of patterned lights. Light diffusers are provided. Reflective surfaces for concentrating light or for duplicating image contents are provided. Of course, other tools and accessories available in photographic studios that are capable of being simulated can also be incorporated into a virtual studio following the method of the invention. Some examples of other tools include tables, props, curtains, and shadow castino shapes.

Many other photographic articles are simulated in the photographic studio. Filters for altering colour, texture, and focus are available for disposing between a virtual camera lens and the virtual object. Polarising filters are used for removing glare when desired. It is evident to those of skill in the art of rendering that simulating filters, flashes polarisers, etc. is a straightforward task. Of course, polarisation information of a virtual object is necessary when accurate polarisation effects are to be captured. For example, some insects are known to produce different colour and polarisation patterns depending on an angle of incidence of light; to accurately simulate photographing of these insects using a polarisation filter, bidirectional reflectance distribution function (BRDF) information as well as polarisation information is required. Defining additional virtual photographic tools for use in rendering is possible using existing rendering techniques and applying them to simulating photographic accessories.

In an alternative embodiment, any lens and any parameter value is supported by the method of the invention. A camera lens having a 51.3 mm focal length is difficult to achieve deterministically using a conventional camera. Lenses with that focal length are not commercially available; a zoom lens must be adjusted to that exact focal length. Using a method according to the invention, such a lens is simulated with a desired level of precision.

According to the invention, simulation of photographing an artifact results in numerous photographs of the artifact from a single digitised three-dimensional model. This obviates the need to expose the artifact to further harmful effects once the initial three-dimensional modeling is complete. In essence, an unlimited number of photographs of a work of art or of an artifact are possible without further access, manipulation, or other harmful actions to the art work or artifact.

Numerous other embodiments may be envisaged without departing from the spirit and scope of the invention.

What is claimed is:

1. A method of digitally simulating the functionality of a photographic camera having a lens, an imaging plane and parameter values effecting imaging comprising the steps of:
    aa) scanning a real three-dimensional object including the step of determining normal reflectance colour information for the real three-dimensional object to provide three-dimensional data representative of a virtual three-dimensional object;
    a) locating within a virtual space the virtual three-dimensional object to be imaged in two dimensions;
    b) providing parameter values from the parameter values; and,
    c) rendering a two-dimensional digital image of the virtual three-dimensional object by simulating light passing through the lens and onto the imaging plane of the photographic camera having parameter values substantially the same as the provided parameter values.

2. A method of simulating the functionality of a photographic camera as defined in claim 1 wherein the parameter values comprise at least one of f-stop, lens focal length, lens focus distance, lens location, and imaging plane orientation relative to the lens.

3. A method of simulating the functionality of a photographic camera as defined in claim 1 wherein at least one of depth of field of the two-dimensional image, focus of the two-dimensional image, and the perspective of the two-dimensional image is determined in dependence upon the parameter values.

4. A method of simulating the functioniality of a photographic camera as defined in claim 1 further comprising the step of simnulating one or more optical photographic filters disposed in front of the camera lens.

5. A method of simulating the functionality of a photographic camera as defined in claim 4 comprising the step of:
    providing data relating to polarisation of light reflected from a surface of the retail three-dimensional object, wherein the one or more optical photographic filters comprise a polarising filter.

6. A method of simulating the functionality of a photographic camera as defined in claim 1 further comprising the step of selecting a lighting condition from a plurality of predetermined lighting conditions.

7. A method of simulating the functionality of a photographic camera having a lens, an imaging plane and parameter values effecting imaging comprising the steps of:
    aa) scanning a real three-dimensional object including the step of determining geometric normal reflectance colour information for the real three-dimensional object to provide three-dimensional data representative of a virtual three-dimensional object;
    a) locating within a virtual space the virtual three-dimensional object to be imaged in two-dimensions;
    b) locating within a virtual space a virtual light source;
    c) providing a parameter value indicative of a desired depth of field; and,
    d) rendering a two-dimensional digital image of the virtual three-dimensional object and having the desired depth of field by simulating light from the virtual light source passing through the lens and onto the imaging plane of the photographic camera having an aperture dependent upon the desired depth of field.

8. A method of simulating the functionality of a photographic camera as defined in claim 7 wherein the two-dimensional image is rendered by determining light from the virtual light source reflected off of the virtual object and through the lens and onto the imaging plane of the photographic camera.

9. A method of simulating the functionality of a photographic camera as defined in claim 7 further comprising the step of providing a further parameter value.

10. A method of simulating the functionality of a photographic camera as defined in claim 9 wherein the further parameter value is determinative of a lens type for the camera being simulated.

11. A method of simulating the functionality of a photographic camera as defined in claim 10 wherein the further parameter value comprises one of aperture, shutter speed, focus, and zoom.

12. A method of simulating the functionality of a photographic camera as defined in claim 9 wherein the further parameter value is determinative of a lens location and orientation.

13. A method of Simulating the functionality of a photographic camera as defined in claim 7 further comprising the step of orienting an imaging plane relative to the camera lens to vary the angle between the imaging plane and the optical axis of the camera lens.

14. A method of simulating the functionality of a photographic camera as defined in claim 7 further comprising the step of simulating camera movement during exposure of film.

15. A method of digitally simulating the functionality of a photographic camera having a lens, an imaging plane and parameter values effecting imaging comprising the steps of:
    aa) scanning a real three-dimensional object including the step of determining bi-directional reflectance distribution function colour information for the real three-dimensional object to provide three-dimensional data representative of a virtual three-dimensional object;
    a) locating within a virtual space the virtual three-dimensional object to be imaged in two dimensions;
    b) providing parameter values from the parameter values; and, c) rendering a two-dimensional digital image of the virtual three-dimensional object by simulating light passing through the lens and onto the imaging plane of the photographic camera having parameter values substantially the same as the provided parameter values.

16. A method of simulating the functionality of a photographic camera having a lens, an imaging plane and parameter values effecting imaging comprising the steps of:

aa) scanning a real three-dimensional object including the step of determining bi-directional reflectance distribution function colour information for the real three-dimensional object to provide three-dimensional data representative of a virtual three-dimensional object;

a) locating within a virtual space the virtual three-dimensional object to be imaged in two-dimensions;
b) locating within a virtual space a virtual light source;
c) providing a parameter value indicative of a desired depth of field; and,
d) rendering a two-dimensional digital image of the virtual three-dimensional object and having the desired depth of field by simulating light from the virtual light source passing through the lens and onto the imaging plane of the photographic camera having an aperture dependent upon the desired depth of field.

* * * * *